United States Patent [19]

Chambers

[11] 4,077,868

[45] Mar. 7, 1978

[54] METHOD FOR OBTAINING HYDROCARBON PRODUCTS FROM COAL AND OTHER CARBONACEOUS MATERIALS

[75] Inventor: R. William Chambers, Tustin, Calif.

[73] Assignee: Deco Industries, Inc., Irvine, Calif.

[21] Appl. No.: 743,939

[22] Filed: Nov. 22, 1976

Related U.S. Application Data

[63] Continuation-in-part of Ser. No. 548,498, Feb. 10, 1975, abandoned, which is a continuation-in-part of Ser. No. 472,788, May 23, 1974, abandoned, which is a continuation-in-part of Ser. No. 384,319, Jul. 31, 1973, abandoned.

[51] Int. Cl.$^2$ ............................ C10G 1/08; C10G 1/02
[52] U.S. Cl. ........................................... 208/10; 208/8; 208/11 R; 201/25; 201/33; 201/35
[58] Field of Search ............... 208/8, 9, 11 R; 201/25, 201/32, 35, 33

[56] References Cited

U.S. PATENT DOCUMENTS

| | | | |
|---|---|---|---|
| 1,450,888 | 4/1923 | Illingworth | 201/35 |
| 1,627,162 | 5/1927 | Egloff | 208/11 R |
| 1,916,900 | 7/1933 | Vandegrift et al. | 208/11 R |
| 1,936,819 | 11/1933 | Bayer | 208/10 |
| 1,946,721 | 2/1934 | Still | 208/8 |
| 1,978,984 | 10/1934 | Carter | 208/8 |
| 3,186,923 | 6/1965 | Lyness | 201/35 |
| 4,052,293 | 10/1977 | Mercer et al. | 208/11 R |

FOREIGN PATENT DOCUMENTS 360,404   10/1931   United Kingdom .................... 208/9

*Primary Examiner*—Delbert E. Gantz
*Assistant Examiner*—James W. Hellwege
*Attorney, Agent, or Firm*—Wills, Green & Mueth Law Corporation

[57] ABSTRACT

An elongated tube (preferably stainless steel) is maintained at a temperature of at least about 1000° F. throughout its length. Coal or other carbonaceous feed material is moved through the tube at a uniform rate of speed in the substantial absence of air, with the feed material being constantly churned or turned as by a screw conveyor. The churning of the feed material and the diameter of the tube is such that the material is subjected to "shock" heating, whereby gases and vapors are violently released from the solid mass and are removed therefrom at a vacuum of from about two to about five inches of mercury, with said gases and vapors passing through the aforesaid churning mass. The residue is recovered and the gases and vapors are subsequently passed through conventional condensers and scrubbers to liquify the oil and separate the gases and the water.

22 Claims, 1 Drawing Figure

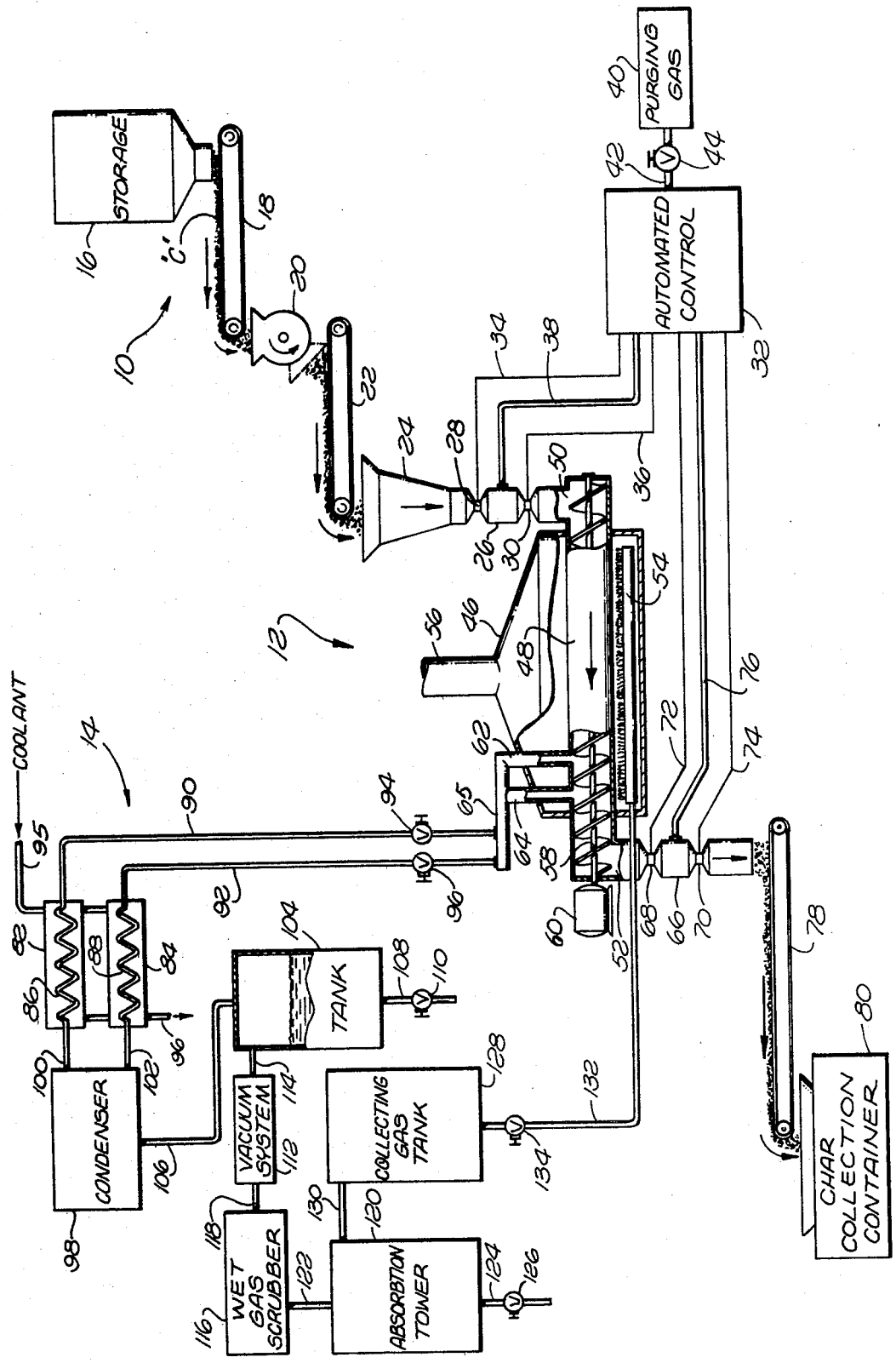

4,077,868

METHOD FOR OBTAINING HYDROCARBON PRODUCTS FROM COAL AND OTHER CARBONACEOUS MATERIALS

CROSS-REFERENCE TO RELATED APPLICATIONS

This application is a continuation-in-part of Ser. No. 548,498, filed Feb. 10, 1975, now abandoned, which is a continuation-in-part of Ser. No. 472,788, filed May 23, 1974, now abandoned, which is a continuation-in-part of Ser. No. 384,319, filed July 31, 1973 (now abandoned).

BACKGROUND AND BRIEF SUMMARY OF THE INVENTION

The present invention relates generally to the recovery and/or production of solid, liquid and gases hydrocarbon products from coal and other carbonaceous materials, and more particularly to a novel method for producing and/or recovering relatively large amounts of methane and higher homologues thereof, oil, and a clean, high-carbon char from coal and other carbonaceous materials.

Prior to World War II, fuel gas was produced or manufactured in Europe and in the United States by the destructive distillation of coal. However, such manufactured gas had a relatively low heat rating, i.e. 475–560 B.t.u. per cubic foot, and accordingly, when natural gas became plentiful in the United States after World War II, it quickly replaced the manufactured gas because the former had a relatively high B.t.u. rating of about 1,030. Unfortunately, the consumption of gas has been steadily increasing in the United States, and the supplies thereof have been decreasing.

Because of problems with the dwindling supplies and availability of natural gas and gasoline, there has been renewed interest in the United States in the production of gas and oil from such carbonaceous materials as coil, oil shale and tar sand. Much of such attention has been directed to the use of coal as a source of such gas and oil because coal is relatively plentiful in the United States, and is found in 30 of the 50 states. It has been stated that at the present rate of consumption, the proved coal reserves in the United States would not be exhausted for some 600 years, and even if coal were to become the sole source of energy for the United States, the total reserves would be sufficient for close to 100 years even with the normal projected increases in the consumption of gas and oil.

The apparatus and processes which are presently being investigated for the commercial production of gas from coal are described in the March 1974 issue of Scientific American magazine and the November 1973 issue of Fortune magazine. The two systems which are apparently receiving the greatest amount of attention are the Lurgi process and the Koppers-Totzek process. However, neither of these processes appear to be the answer to the problem. Thus, both produce a gas which is basically a mixture of carbon monoxide and hydrogen, plus a small amount of methane, and with a heating value in the neighborhood of 300 B.t.u. per cubic foot . . . far below the B.t.u. rating of 1030 for natural gas. Also, such a gas could not be used generally because carbon monoxide is poisonous.

Other problems with the aforementioned processes are that they both require oxygen and steam in large quantities. Also, the Lurgi process requires coal of a particular size, and a coal which is substantially non-caking so that it will not form a solid mass and prevent the passage of gas through the coal bed during the extraction process.

Other processes are currently being investigated for the production of a high B.t.u. gas, but they are all expensive and relatively complicated.

Numerous patents have also issued, showing and describing various types of apparatus and processes for the production of gas and oil from coal and the like, but none appears to be commercially acceptable. Representative of these U.S. patents are Nos. 1,257,772; 1,378,643; 1,407,018; 1,458,357; 1,479,827; 1,482,342; 1,658,143; and 3,475,279. In these processes, coal, shale, or tar sand is moved either over heated walls, under heated walls, through heated stationary cylinders or through heated rotating cylinders, or into and through hot molten metal; by means of endless conveyors or screw conveyors; in the presence or the absence of air; either at a constant temperature or at a temperature which increases from the inlet to the outlet; and with the gas and vapors being removed from either the end, or the top or from the bottom of the retort.

With the exception of U.S. Pat. No. 3,475,279, few, if any, discloses the amounts or the analysis of the purported by-products. In the last mentioned patent, it is stated that the approximate yield per ton of coal processed has been 37 gallons of tar or heavy oil and 1950 cubic feet of gas having a heating value of approximately 919 gross B.t.u. per cubic foot. Although the heat content of the gas approaches the heating value of natural gas, the volume of gas produced is relatively low. Also, in said process it is apparently necessary to have an airtight system and to maintain pressure within the heating chamber near atmospheric pressure and the pressure in the coal bed slightly below atmospheric pressure . . . which might be difficult to accomplish.

With the aforementioned limitations and deficiencies of known apparatus and processes in mind, it is a general object of the present invention to provide a novel method for directly converting coal and other carbonaceous materials into usable hydrocarbon products. More particularly, it is an object to obtain relative large amounts of high Btu gases, low-sulfur oil, and a high-carbon char from coal and other carbonaceous materials, employing a single-stage, continuous process which does not require the addition of steam and/or oxygen, nor require extremely high temperatures or pressures.

More particularly, one of the primary objects of the present invention is to obtain directly from untreated coal which can contain rocks and other debris, a gas which has a Btu content substantially the same as "natural" gas. Specifically, it is an object to directly obtain such a gas from coal, which contains a relatively large amount of methane and the higher homologues thereof, without the necessity of going through a separate methanation step or process.

Another primary object of the present invention is to produce a clean-burning carbon char from coal and like carbonaceous materials.

Yet another primary object is to produce from coal and like carbonaceous materials, lumps or small masses of char which have a relatively large surface area or reactive carbon and which are relatively free of tars and other repolymerized hydrocarbon components. Specifically, it is an object of this invention to directly produce from coal, highly reactive carbon masses with large surface areas, which masses are substantially free of gases, tars, and repolymerized hydrocarbon components.

Another object of the present invention is to provide a novel method for obtaining hydrocarbon products directly from coal and other carbonaceous feed materials without pretreating the feed material.

A further object is to provide a novel method for obtaining hydrocarbon products directly from coal and other carbonaceous feed materials without the use of high pressure and/or high temperatures.

I have discovered that the above objects and advantages are achieved by continuously moving a mass of coal or other carbonaceous feed material through an elongated tube or pipe-like heat chamber maintained at a temperature of between about 1100° F. and 1800° F. throughout its length, in the absence of air and/or oxygen, with the feed material being turned or stirred as by means of a screw conveyor as it passes through the heat chamber, and with the gases and vapors being removed from the heat chamber adjacent the outlet end thereof by means of a vacuum of from about two inches to five inches of mercury. Based upon present information, it appears that the relatively high temperature in the tube adjacent the inlet, the stirring of the feed material to expose it to the heat, and the vacuum which exists throughout the length of the tube causes a sudden, deep "shock" heating of the feed material, such that the gases and vapors virtually "explode" therefrom. Thus, the heat causes a vigorous expulsion of the vapors and gases from the feed material and the vacuum causes said vapors and gases to be pulled through the churning bed of feed material in contact with the carbon, as compared with permitting the gases and vapors to slowly percolate through the bed and be withdrawn at regular intervals along the length of the tube. Also, it appears that the small amounts of transition metals in coal and tar sands such as iron, copper and nickel . . . or the metal of the tube . . . act as catalysts, whereby the steam produced from the water in the coal and tar sands is reduced to possibly a metal oxide and highly reactive hydrogen, and the hydrogen combines with the free carbon to form methane and the higher homologues of methane.

BRIEF DESCRIPTION OF THE DRAWINGS

The FIGURE in the drawing is a schematic elevational view, somewhat in the nature of a flow diagram, illustrating one form of apparatus and method for practicing the teachings of the present invention when processing coal or other carbonaceous material.

DESCRIPTION OF THE PREFERRED EMBODIMENT

As mentioned above, various carbonaceous materials can be processed employing the subject method and apparatus, but for convenience, coal will be referred to as being the feed material in the following description.

Referring to the drawing more particularly be reference numerals, one type of apparatus for practicing the teachings of the present invention includes generally a loading system 10, a reactor system, 12, and a product recovery system 14.

The loading system contains a storage bin 16 from which coal can be selectively discharged onto a first conveyor 18 which carries the coal to a measurer 20, from which it can be dumped onto a second conveyor 22, from which it is discharged into a hopper 24.

Position beneath the hopper 24 is an air-tight inlet chamber 26 which has an inlet 28 for admitting a charge of coal into the chamber, and an outlet 30 for discharging the coal therefrom. Each inlet and outlet is provided with a sliding door movable between an open position and a closed position, responsive to signals from an automated control 32 transmitted through control lines 34 and 36, respectively. The specific means for controlling the movement of said doors is a matter of choice and can be either electrical, hydraulic or pneumatic.

Extending between the inlet chamber 26 and the control 32, is a first purging conduit 38, which can be selectively placed in communication with a container 40 of purging gas such as nitrogen, through a pipe 42 which contains a valve 44.

The reactor system 12 includes an insulated retort 46 through which extends an elongated pipe or tube 48, preferably made from stainless steel, and which contains an inlet 50 and an outlet 52.

A source of heat such as a gas burner 54 is provided in the retort 46 beneath the tube 48, and a vent or chimney 56 is provided at the top of the retort for the discharge of the products of combustion therefrom.

A screw conveyor 58, which is driven by an electric motor 60 extends through the tube 48 from adjacent the inlet 50 to adjacent the outlet 52, for moving the coal through the tube at a uniform rate of speed with a churning or stirring movement, whereby to continuously expose all of the lumps or particles of coal to the heat in the retort.

First and second product outlet pipes 62 and 64, respectively, are in communication with a connector pipe 65 and with the interior of the tube 48 adjacent to its outlet end, both of which outlet pipes are within the retort so as to be exposed to the heat therein. Stating it somewhat differently, these product outlet pipes should be maintained at a relatively high temperature so that the hydrocarbon products being removed from the tube as gases or vapors remain in such state, as will be described more fully hereinafter.

Adjacent the outlet 52 of the tube 48 is an air-tight outlet chamber 66 which is similar in construction to the inlet chamber 26 previously described. Thus, it contains an inlet 68 and an outlet 70, each of which is provided with a sliding door movable between an open position and a closed position responsive to the automated control 32 which is in communication therewith through control lines 72 and 74, respectively.

A second purging conduit 76 extends between the outlet chamber 66 and the automated control 32 and is in selective communication with the container 40 of purging gas.

Positioned between the outlet chamber 66 is yet another conveyor 78 for transporting the char to a collection container 80.

The product recovery system 14 includes cooling chambers 82 and 84 which contain coils 86 and 88, respctively, the inlet ends of said coils being in communication with the connector pipe 65 through pipes 90 and 92, which pipes contain valves 94 and 96, respectively.

A coolant inlet pipe 95 and a coolant outlet pipe 96 are in communication with the cooling chambers for causing cooling fluid to pass through said chambers so as to cool the gases and vapors which are produced in the reactor.

The outlet ends of the coils 86 and 88 are in communication with a condenser 98 through pipes 100 and 102, and the condenser is connected to an oil receiving tank 104 by means of a pipe 106. A drain pipe 108 with a valve 110 is in communication with the bottom of the tank 104.

The inlet end of a vacuum system 112, for producing a vacuum of from about two inches to about five inches of mercury, is connected to the upper end of the tank 104 through a pipe 114, and the outlet end thereof is connected to the inlet of a wet gas scrubber 116 of conventional construction, by means of a pipe 118.

The outlet of the scrubber 116 is connected to the upper end of an absorption tower 120, also of conventional construction, by means of a pipe 122, the lower end of said tower containing a drain pipe 124 which is provided with a valve 126.

The upper end of the absorption tower 120 is connected to the upper end of a gas tank 128 by a pipe 130, and the lower end of the gas tank 128 is connected to the gas burner 54 in the retort by a pipe 132 which contains a valve 134.

In operation, the coal "C", which can be of any type and size and without being pretreated or conditioned in any manner whatsoever, and even containing dirt and rock, is discharged from the storage tank 16 onto the conveyor 18. From the conveyor 18, the coal passes to the measurer/mixer 20 which dumps a measured amount of coal onto the conveyor 22, which, in turn, discharges the coal into the hopper 24.

The automated control 32 is adjusted so that with the outlet 30 of the inlet chamber 26 in the closed position, the inlet 28 is opened to permit a measured charge of coal to enter into the inlet chamber 26. Thereafter, the inlet 28 is closed and a charge of purging gas such as nitrogen is admitted into the inlet chamber 26 through the conduit 38, whereby to displace all of the air from the inlet chamber 26.

With the inlet 28 closed, the outlet 30 of the chamber 26 is opened, whereby the coal "C", passes through the inlet 50 of the tube 48 and is carried through the tube by means of the screw conveyor 58.

The opening and closing of the inlet 28 and outlet 30 and the purging of the inlet chamber 26 with a gas such as nitrogen, occurs at relatively short intervals of time, whereby there is practically a continuous flow of coal into the inlet end of the tube 48.

The char which remains after the vapors and gases are removed from the coal, passes through the outlet 52 of the tube and into the outlet chamber 66. The outlet chamber 66 functions in a manner similar to the inlet chamber 26, with the outlet 70 being closed and the inlet 68 being opened to permit a charge of char to pass into the outlet chamber, with the inlet 68 then being closed and the outlet 70 opened to deposit the char onto the conveyor 78. The outlet 70 is then closed, with both the inlet and outlet in the closed position, purging gas is admitted into the outlet chamber through the conduit 76, so as to purge any air from the outlet chamber. Thereafter, the inlet 68 is opened to permit another charge of char to enter the outlet chamber, and the sequence is again repeated to discharge the char onto the conveyor 78, and into the collection container 80. As mentioned hereinabove, the opening and closing of the inlet 68 and the outlet 70, and the purging of the outlet chamber 66, occur at relatively short intervals of time, whereby there is substantially a continuous flow of char from the outlet 52 of the tube 48 and onto the conveyor 78.

Before describing the operation of the product recovery system 14, it would appear to be advisable to briefly explain what I believe occurs in the tube 48, insofar as concerns the production and/or removal of hydrocarbon gases and vapors.

As will be explained more fully hereinafter, I have learned that the temperature in the retort 46 should be at least 1000° F., and preferably as high as 1800° F. Also, that the vacuum within the tube 48 should be from about two inches to about five inches of mercury. I have also discovered that the residence time of the coal in the tube 48 while the reaction and/or extraction occurs, should be no less than about 15 minutes, and that there is no upper limit on the residence time, other than that dictated by economics.

The diameter of the tube 48 and the speed at which the coal is moved through the tube 48 by the conveyor 58 should be such that the temperature of the coal being processed reaches the mean temperature in the retort within a few feet of the side of the retort adjacent the inlet 50. Thus, it appears that the sudden increase in the temperature of the coal to no less than about 1000° F. by the time it has moved a few feet into the retort, causes a sudden "shock" heating of the coal, which, together with the vacuum in the tube, causes the vapors and gases to virtually "explode" from the coal particles, and the vacuum causes them to be carried through the churning, turning mass of coal before they can repolymerize. Stating it somewhat differently, it is believed that the sudden volatilization of the hydrocarbons within the interior of the coal particles, carries the bitumen to the surface of the particle before rupture of the particle takes place and the volatile compounds are liberated.

By contrast, when coal is subjected to a conventional heat treatment, such volatile products repolymerize into much larger and more thermally stable molecules of solid matter, which are trapped and retained in the charge particles.

It has been postulated that the aforementioned "shock" heating and the vacuum within the tube 48 causes the water in the coal to form steam, which, in the presence of a transition metal such as iron in the coal itself or in the tube 48, causes a reduction of the steam to hydrogen and possibly a metal oxide. The hydrogen is then pulled through the churning, turning bed of coal by reason of the vacuum, whereby the hydrogen combines with free carbon to form methane gas, and the higher homologues of methane. Obviously, the oil which is in the coal, passes therefrom in the form of a vapor.

Returning to a consideration of the product recovery system 14, I have learned that it is advantageous to have two, spaced-apart product outlet pipes, such as pipes 62 and 64, adjacent the outlet end of the tube 48 and within the confines of the retort 46. Thus, it appears that the lighter gases pass through the first outlet pipe 62, and the heavy gases and vapors pass through the second outlet pipe 64, whereby the chances of clogging are greatly reduced. Also, the portions of the outlet pipes which are on the exterior of the retort, as well as the connector pipe 65, should be insulated to prevent the vapors from condensing prematurely.

As will be apparent from the drawing, the gases and vapors pass through the pipes 90 and 92, through the cooling coils 86 and 88, and through the condensor 98 and into the upper portion of the tank 104.

The oil which is extracted from the coal, and any remaining water, is connected in the tank 104, from which it can be drained by means of the drain pipe 108.

The remaining gases pass through the vacuum system 112, through the wet gas scrubber 116, and into the top of the absorption tower 120. Methane gas and the higher homologues thereof pass downwardly through the absorption tower and can be withdrawn through the pipe 124. Other fuel gases pass through the pipe 130 and into the gas tank 128, and thence through the pipe 132 to the gas burner 54.

The char which has been produced following the teachings of the present invention, is relatively soft and very black, and appears to be free of condensible hydrocarbons and to consist essentially of highly reactive carbon. Accordingly, if desired, this highly reactive carbon char could be used with other known processes for the production of methane gas.

Also, because the char produced by the subject process is of light density and high porosity, and has high reactivity, it is very suitable for use as the starting material in producing activated carbon using conventional carbon activation techniques.

EXAMPLE NO. 1

One type of coal which I have used in the subject process was untreated coal obtained from Japan. It had the following analysis, in which the percentages are by wieght.

| Component | Percentage |
|---|---|
| Moisture | 2 |
| Volatile Matter | 38 |
| Fixed Carbon | 50 |
| Ash | 10 |
| Sulphur | 0.3 |
| (Transition metals as part of ash, 1.8%) | |

Approximately one ton (2,000 pounds) of said coal was processed in accordance with the teachings of the present invention at a temperature of 1000° F. and a vacuum of four inches of mercury.

The yield was 1.33 barrels of oil, 0.65 tons of char, and 12,000 cubic feet of gas having the following composition.

| Molecule | % By Volume |
|---|---|
| $H_2$ | 2% |
| CO | 9% |
| $CH_4$ | 34% |
| $CO_2$ | 14% |
| $C_2H_6$ | 9% |
| $C_3H_8$ | 5% |
| $C_4$ and Higher | 6% |
| $H_2O$ | 8% |
| $N_2/O_2$ | 13% |

EXAMPLE NO. 2

One type of untreated, mine-run United States bituminus coal which I have used, had the following analysis, with the percentages being by weight.

| Component | Percentage |
|---|---|
| Moisture | .1 |
| Volatile Matter | 29.0 |
| Fixed Carbon | 66.6 |
| Ash | 4.4 |
| Sulphur | .32 |
| (Transition metals as part of ash, 1.3%) | |

Approximately one ton (2,000 pounds) of the above bituminus coal was processed with the temperature of the retort at 1100° F., and with the vacuum at about five inches of mercury. The yield was about 1.5 barrels of oil, 0.60 tons of char, and about 16,000 cubic feet of gas having the following composition:

| Molecule | % By Volume Gas Composition |
|---|---|
| $H_2$ | 5 |
| CO | 9 |
| $CH_4$ | 45 |
| $CO_2$ | 7 |
| $C_2H_6$ | 11 |
| $C_3H_8$ | 6 |
| $C_4$ (and higher) | 6 |
| $H_2O$ | 4 |
| $N_2/O_2$ | 7 |

Effect of Different Temperatures

EXAMPLE NO. 3

Using the aforementioned United STates bituminus coal with a vacuum of about four inches of mercury, the effect of different temperatures in the retort is shown by the following results:

| TEMPERATURE OF FURNACE, ° F. | $CH_4$ | PERCENT, (BY VOLUME) $C_2H_6$, $C_3H_8$, $C_4H_{10}$ |
|---|---|---|
| 800 | 20 | 5 |
| 900 | 30 | 6 |
| 1000 | 42 | 20 |
| 1100 | 45 | 22 |
| 1200 | 46 | 23 |

The upper range of temperature is about 1800° F., and, as the temperature is increased above 1200° F., there is no appreciable increase in the recovery of the desirable hydrocarbons. Between about 1500° F. and 1600° F. there appears to be a slight problem with the oil starting to "crack" and causing tars to be produced.

Effect of Different Vacuums

EXAMPLE NO. 4

I have ascertained that a vacuum in the tube of from about two inches to about five inches of mercury produces the desired result of causing the liberated and/or produced gases and vapors to be pulled through the churning mass of coal. The flow of gases and vapors through the coal mass should be fast enough to avoid repolymerization, but not so fast as to prevent the formation of methane and the higher homologues of methane due to the reaction between hydrogen and carbon.

Effect of Air In Tube

EXAMPLE NO. 5

The effect of the presence of air and/or oxygen in the tube on the amount of methane and the higher homologues thereof which are produced at a temperature of 1000° F. and a vacuum of five inches of mercury, is shown by the following table, in which the percentages of gases is by volume.

| Run | $N_2/O_2$ | CO | $CO_2$ | $H_2O$ | $CH_4$ | $C_2H_6$ | $C_3H_8$ |
|---|---|---|---|---|---|---|---|
| 1 | 1 | 4 | 6 | 3 | 68 | 11 | 7 |
| 2 | 7 | 6 | 8 | 6 | 43 | 12 | 6 |
| 3 | 44 | 6 | 13 | 8 | 20 | 5 | 4 |
| 4 | 70 | 5 | 12 | 3 | 7 | 2 | 1 |

EXAMPLE NO. 6

Another carbonaceous feed material which I have processed employing the subject method and apparatus, is North Dakota lignite (mine run).

Two hundred pounds of this lignite was processed at a temperature of 1050° F., and a vacuum of 5.5 inches of mercury.

Based upon the processing of one ton (2,000 pounds) of this material, the yield was 190 pounds of oil, 840 pounds of char, 820 pounds of water, and 3,100 cubic feet of gas. The water contained small carbon particles which apparently were carried along with the vapor. After the gas was "scrubbed", it had a Btu value of approximately 410.

The gas analysis by volume was as follows:

| $N_2$ | CO | $CO_2$ | $CH_4$ | Ethane | Propane | Butane |
|---|---|---|---|---|---|---|
| 8.2 | 13.0 | 43.0 | 14.7 | 3.0 | 1.1 | trace |

EXAMPLE NO. 7

In order to determine whether it might be advantageous to separately remove some of the water from the lignite, I first processed 2000 pounds of the same feed material at a temperature of 499° F. and a vacuum of 5 inches of mercury. The yield was 118 pounds of relatively dry material and 82 pounds of water.

The 118 pounds of feed material was then processed using the subject apparatus and method at 1050° F. and a vacuum of 5 inches of mercury.

Based on the processing of one ton (2,000 pounds) of such material, the yield was 130 pounds of oil, 735 pounds of char, 95 pounds of water, and 2,970 cubic feet of gas. The char resembled carbon black in appearance and texture, and the gas had a Btu value of approximately 550.

The gas analysis, by volume, was as follows:

| $N_2$ | CO | $CO_2$ | $CH_4$ | Ethane | Propane | Butane |
|---|---|---|---|---|---|---|
| 7.5 | 6.0 | 6.0 | 27.0 | 3.0 | 5.8 | trace |

Comparing the results of Example No. 7 with the results of Example No. 6, it appears that the removal of some of the water, produced a gas with less carbon dioxide, and more methane, ethane and propane, thereby providing a somewhat higher Btu value. However, the economics of removing some of the water was not investigated any further.

Another carbonaceous material which I have successfully processed, is tar sands.

EXAMPLE NO. 8

One hundred pounds of tar sands were processed through the aforementioned apparatus at a temperature of 1000° F. and with a vacuum of four inches of mercury, with the following yield based upon the processing of one ton (2,000 pounds) of tar sands feed material.

| Oil | 200 pounds |
|---|---|
| water | 30 pounds |
| Char | 1600 pounds |
| Gas | 1460 standard cubic feet |

Using a Hewlett Packard 4830A Gas Chromatograph, the gas was sampled as follows, based upon percentages by volume.

| $N_2$ | CO | $CO_2$ | $CH_4$ | Ethane | Propane | Butane |
|---|---|---|---|---|---|---|
| 20.0 | 1.4 | 11.9 | 8.2 | 4.5 | 5.2 | 3.6 |

EXAMPLE NO. 9

Another one hundred pounds of tar sands were processed at a temperature of 1,000° F. and with a vacuum of three inches of mercury, with the following results based upon the processing of one ton (2,000 pounds) of such feed material.

| oil | 230 pounds |
|---|---|
| water | 30 pounds |
| char | 1520 pounds |
| gas | 1640 standard cubic feet |

The gas analysis, based upon percentages by volume, was as follows:

| $N_2$ | CO | $CO_2$ | $CH_4$ | Ethane | Propane | Butane |
|---|---|---|---|---|---|---|
| 29.4 | 1.5 | 11.5 | 10.3 | 7.0 | 6.5 | 4.7 |

The oil obtained from the tar sands was analyzed by an independent testing laboratory, with the following results:

| Tests: | Lab No. 1504 | Lab No. 1505 |
|---|---|---|
| API Gravity at 60° F | 18.5 | 20.0 |
| Flash Point (PMCC) ° F | 72 | 46 |
| Viscosity at 100 ° F SSU | 65.0 | 52.63 |
| Sulfur % Wt. | 2.90 | 1.90 |
| Ash % Wt. | 0.107 | 0.110 |
| BTU/# | 18,729 | 18,148 |
| BTU/BBL. | 6,179,671 | 5,928,516 |
| Distillation (° F) | | |
| Initial Boiling Point | 202 | 194 |
| Cracked | 220 | 218 |

EXAMPLE NO. 10

At one time, it was believed necessary or advisable to mix diesel oil with the tar sands, to facilitate the processing thereof. After further testing however, it was determined that there was no advantage in doing so, and, in fact, it merely increased the cost without any particular advantage.

Thus, 5 pounds of diesel oil was intermixed with 100 pounds of tar sands, and the mixture processed at 1100° F. and a vacuum of 3 inches of mercury. After subtracting the additional diesel oil, the results (based upon the processing of 2,000 pounds of tar sands) was 220 pounds of oil, 30 pounds of water, 1560 pounds of char, and 1640 cubic feet of gas.

The gas analysis, by volume, was as follows:

| N₂ | CO | CO₂ | CH₄ | Ethane | Propane | Butane |
|------|-----|------|------|--------|---------|--------|
| 26.2 | 2.3 | 13.8 | 12.6 | 6.0 | 10.3 | 5.1 |

EXAMPLE NO. 11

Another carbonaceous material which appears to have good potential for the obtaining of hydrocarbon products therefrom, is wood or timber, either in the form of chips or bark.

Thus, 100 pounds of hard wood chips were processed in the described apparatus at a temperature of 1050° F., and a vacuum of 5.5 inches of mercury. The yield based upon a ton (2,000 pounds) of this feed material, was 340 pounds of oil, 370 pounds of char 1120 pounds of water, and 1220 cubic feet of gas. The water was very dark, and contained small particles of carbon or char which had apparently been carried over with the vapor. The gas had a Btu value of about 409, and the following analysis, by volume.

| N₂ | CO | CO₂ | CH₄ | Ethane | Propane | Butane |
|-----|-----|------|------|--------|---------|--------|
| 6.0 | 6.0 | 12.0 | 10.0 | 2.0 | Trace | Trace |

EXAMPLE NO. 12

Softwood and bark was also processed. Thus, 100 pounds was also processed at a temperature of 1050° F. and a vacuum of 5.5 inches of mercury. Based upon one ton (2,000 pounds) of feed material, the yield was 145 pounds of oil, 240 pounds of char, 1440 pounds of water, and 430 cubic feet of gas. The water was light green in color, and contained small particles of carbon or char.

The gas analysis by volume, was as follows:

| N₂ | CO | CO₂ | CH₄ | Ethane | Propane | Butane |
|-----|-----|------|------|--------|---------|--------|
| 7.0 | 5.0 | 22.0 | 7.5 | 2.0 | Trace | Trace |

EXAMPLE NO. 13

Yet another carbonaceous material tested, was peat moss. Fifty pounds of this material was processed in the described apparatus at a temperature of 1000° F., and a vacuum of 3 inches of mercury. Based upon the processing of one ton (2,000 pounds), the yield was 290 pounds of oil, 560 pounds of water, 800 pounds of char, and 3200 cubic feet of wet gas.

The gas analysis, by volume, was as follows:

| N₂ | CO | CO₂ | CH₄ | Ethane | Propane | Butane |
|-----|------|------|------|--------|---------|--------|
| 2.8 | 15.4 | 49.6 | 8.8 | 1.3 | 2.3 | 2.0 |

It is anticipated that other carbonaceous feed material would yield similar types of hydrocarbon products, bearing in mind that the "oil" which is produced can be expected to be different from the type obtained from coal and tar sands, depending upon the type of feed material.

As mentioned above, it is postulated that coal contains small amounts of transition metals which act as catalysts, whereby the steam produced from the water in the coal is reduced to possibly a metal oxide and highly reactive carbon, with the hydrogen combining with the free carbon to form methane gas and the higher homologues of methane.

It is believed that the same phenomenon occurs with the other carbonaceous materials which have been processed, and particularly tar sands, but the results have not been as startlingly as with coal, possibly because of the "physical" and chemical relationship among the hydrocarbon components of the feed material.

By way of example, I have discovered that at 1,000° F., relatively large amounts of gases are produced or driven out of the coal along with the vapor, which vapor is later condensed into a relatively heavy or thick oil. However, if the temperature is reduced, both the amounts of gases and vapor are likewise reduced, but to a greater extent.

On the other hand, when tar sands are processed at 1000° F., there is relatively little gas which is produced or driven off with the vapor, but the oil is relatively light and of much better quality. However, if the temperature is increased to obtain more gas, the oil is heavier and of poorer quality.

I claim:

1. The method of obtaining hydrocarbon products from solid carbonaceous feed material containing water and hydrocarbons, including the steps of:
   continuously moving the feed material through an elongated tubular member maintained at an operating temperature between about 1000° F. and about 1800° F., in the substantial absence of oxygen; and
   withdrawing gases and vapors from the tubular member under a vacuum within the tubular member in a manner to cause such gases and vapors to flow through said material as it moves through the tubular member.

2. The method according to claim 1, in which the material is stirred as it moves through the tubular member so as to increase the contact of such gases and vapors with said material.

3. The method according to claim 1, in which the tubular member contains an inlet and an outlet and the gases and vapors are withdrawn only adjacent the outlet of the tubular member, whereby gases and vapors produced adjacent the inlet of the tubular member are caused to flow through the material in said tubular member.

4. The method according to claim 2, in which the material is moved through the tubular member at a uniform rate of speed and the residence time is no less than about fifteen minutes.

5. The method according to claim 1, in which the vacuum is between about 2 inches and about 5 inches of mercury.

6. The method according to claim 1, in which the temperature of the tubular member is about 1000° F. and the vacuum is about 4 inches of mercury.

7. The method according to claim 1 in which at least a portion of the gas is separated from the vapor and used for heating the tubular member.

8. The method according to claim 1, in which the carbonaceous feed material is selected from the group consisting of coal, lignite, tar sands, wood, and peat moss.

9. The method according to claim 8, in which the feed material is coal; the residence time is no less than about fifteen minutes; and the vacuum is between about two inches and about five inches of mercury.

10. The method according to claim 8, in which the feed material comprises chunks of untreated coal containing debris; the residence time is no less than about fifteen minutes; and the vacuum is between about two inches and about five inches of mercury.

11. The method according to claim 8, in which the feed material is tar sand.

12. The method according to claim 11, in which the tar sand is untreated.

13. The method according to claim 8, in which the feed material is lignite.

14. The method according to claim 8, in which the feed material is wood.

15. The method according to claim 8, in which the feed material is peat moss.

16. The method of obtaining hydrocarbon products from solid carbonaceous feed material containing water and hydrocarbons, including the steps of:
   providing a mass of such feed material;
   moving said mass through a tubular member whereby the temperature of said mass is quickly increased from ambient temperature to an operating temperature of from about 1000° F. to about 1800° F. in the substantial absence of oxygen, to produce steam and vaporized hydrocarbons and in the presence of a transition metal which reduces steam therein produced to hydrogen at said temperature;
   and causing said hydrogen and vaporized hydrocarbons to flow through said mass while
   removing the resultant gases and vaporized hydrocarbons from said mass under a vacuum.

17. The method according to claim 16, in which the feed material is coal, and said feed material is subjected to the operating temperature for no less than about fifteen minutes.

18. The method according to claim 16, in which the feed material is untreated coal, the temperature is about 1000° F., the residence time is no less than about fifteen minutes, and the vacuum is between about two inches to about five inches of mercury.

19. The method according to claim 16, in which the material is agitated during the time the hydrogen and vaporized hydrocarbons are flowing through the mass.

20. The method according to claim 16, in which the vacuum is from about two to about five inches of mercury.

21. The method according to claim 16, in which the feed material is tar sand.

22. The method of producing a high-carbon char from coal, including the steps of:
   providing a mass of coal;
   moving said mass through a tubular member whereby the temperature of said mass is quickly increased from ambient temperature to an operating temperature of from about 1000° F. to about 1800° F. in the substantial absence of oxygen, to cause the sudden expulsion of gaseous hydrocarbons from the mass;
   removing the gaseous hydrocarbons from adjacent said mass under a vacuum before said hydrocarbons can condense or repolymerize on said mass; and
   recovering the char.

* * * * *